Jan. 17, 1967 L. E. KIDWELL, JR 3,299,154
PROCESS FOR PRODUCING MONOMETHYLCYCLOHEXENE MIXTURES
HAVING HIGH CONTENT OF 1-METHYL ISOMER
Filed Aug. 18, 1964
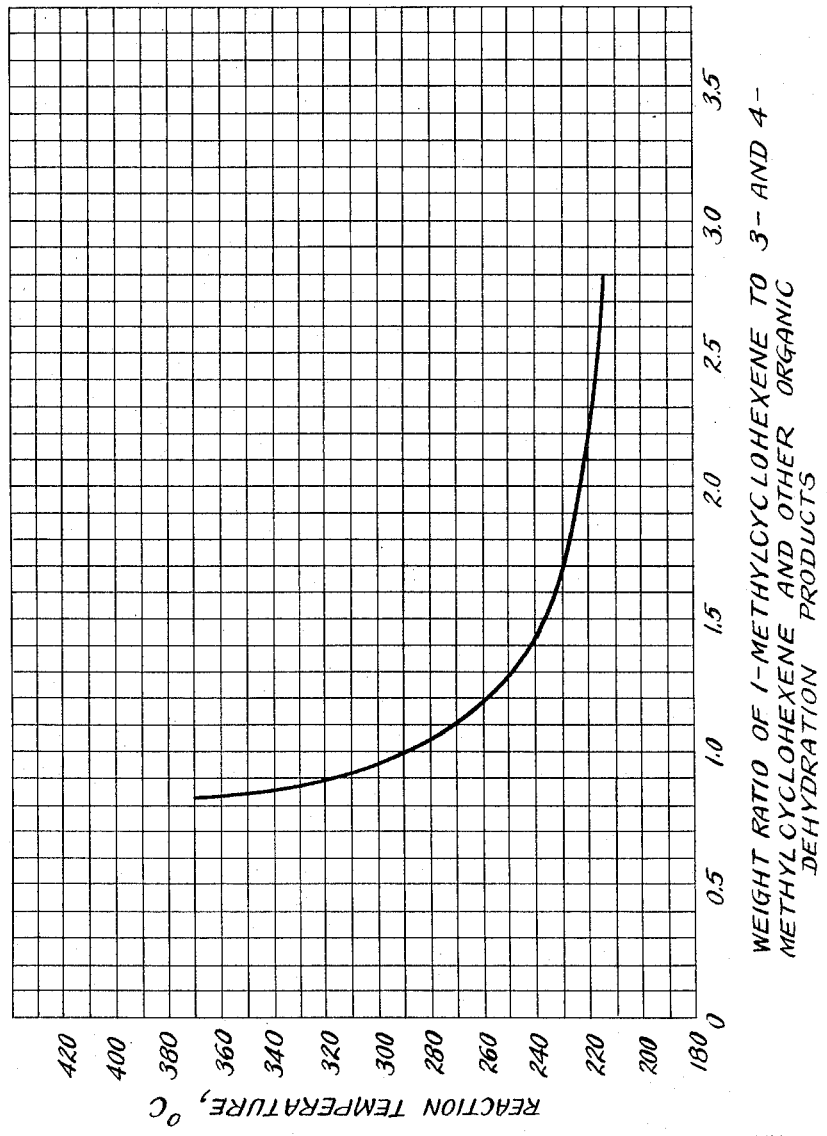
INVENTOR
*Louis E. Kidwell, Jr.*
BY *Bacon & Thomas*
ATTORNEYS

United States Patent Office 3,299,154
Patented Jan. 17, 1967

3,299,154
PROCESS FOR PRODUCING MONOMETHYLCYCLOHEXENE MIXTURES HAVING HIGH CONTENT OF 1-METHYL ISOMER
Louis E. Kidwell, Jr., Midland, Tex., assignor to El Paso Natural Gas Products Company, Odessa, Tex., a corporation of Texas
Filed Aug. 18, 1964, Ser. No. 390,354
4 Claims. (Cl. 260—666)

This invention relates to the preparation of monomethylcyclohexene mixtures by dehydration of 2-methylcyclohexanol and, more particularly, to a process for carrying out such dehydration under conditions which result in a monomethylcyclohexene product having a relatively high content of 1-methylcyclohexene as compared to the 3- and 4-methyl isomers and other organic reaction products.

The monomethylcyclohexene product has utility as a starting material for preparation of high density hydrocarbon fuels by polymerization in the presence of a Friedel-Crafts catalyst as described in my copending application Serial No. 271,572, filed April 9, 1963, now abandoned. I have found that 1-methylcyclohexene is a superior starting material in such reaction as compared to the 3- and 4-methyl isomers. Monomethylcyclohexene mixtures high in the 1-methyl isomer lead to polymerization products having higher thermal decomposition points and lower viscosities. Obviously, the higher the content of 1-methyl isomer in the starting mixture the more desirable such mixture becomes.

It is an object of the invention to provide a simple, economic route for preparation of monomethylcyclohexene mixtures which have a high 1-methylcyclohexene content.

Another object of the invention is to provide a process for dehydrating 2-methylcyclohexanol which will result in production of a monomethylcyclohexene reaction mixture having a high content of 1-methyl isomer with respect to 3- and 4-methyl isomers and other olefinic reaction products.

A further object of the invention is to provide a process for producing from 2-methylcyclohexanol a monomethylcyclohexene mixture having a weight ratio of 1-methylcyclohexene to other olefinic reaction products greater than about 1.3.

I have found that the most convenient and economical method for preparation of monomethylcyclohexenes comprises the dehydration of 2-methylcyclohexanol with hot alkaline alumina. However, when this reaction is carried out under conditions expected to provide optimum dehydration, a mixture of 1-methylcyclohexene with other olefins such as the 3- and 4-methyl isomers and methylenecyclohexane is produced, with the weight ratio of 1-methylcyclohexene to the other olefins in the reaction mixture usually being no greater than about 1.0. I have now discovered that a dehydration product can be produced in which the weight ratio of 1-methylcyclohexene with respect to other olefins is greater than about 1.3 by passing 2-methylcyclohexanol over an aluminum oxide dehydrating catalyst at a temperature in the range of about 210° to about 250° C. and at a space velocity correlated to the selected temperature such that only about 2 to 50% of the 2-methylcyclohexanol is converted to the mixed methylcyclohexenes and methylenecyclohexane. I have discovered that at the relative low temperature and low conversion rate, the content of 1-methylcyclohexene in the reaction product predominates. The reaction mixture contains a substantial quantity of starting 2-methylcyclohexanol but this is readily separated from the olefinic reaction products and can be recycled for further conversion.

The invention is illustrated by the accompanying drawing which shows graphically the effect of reaction temperature on olefin product distribution with a representative feed rate of 2-methylcyclohexanol over a hot alkaline alumina dehydration catalyst. The curve shows that production of 1-methylcyclohexene is favored at lower reaction temperature, with temperatures below about 250° C. down to about 210° C. producing products having a desirably high ratio of this isomer.

The starting 2-methylcyclohexanol may be either the cis or trans isomer or a mixture thereof, the commercially available materials being quite suitable.

The aluminum oxide dehydrating catalyst used in the process of the invention may be any of the commercially available alkaline aluminas. In general, these aluminas contain about 0.02 to about 1.0% by weight of sodium oxide, and have a surface area of about 0.04 to about 350 square meters per gram. However, an aluminum oxide catalyst having a sodium oxide content of at least about 0.1% and a surface area in the range of about 80 to 200 square meters per gram is preferred. Several representative commercially available dehydration catalysts of the preferred type have the following approximate analysis:

ANALYSIS OF TYPICAL DEHYDRATION CATALYST

|  | Catalyst I | Catalyst II |
|---|---|---|
| $Al_2O_3$ | 92% by weight | 99% by weight. |
| $Na_2O$ | 0.80% by weight | 0.35% by weight. |
| $Fe_2O_3$ | 0.12% by weight | 0.005% by weight. |
| $SiO_2$ | 0.09% by weight | <0.10% by weight. |
| $TiO_2$ | 0.01% by weight | |
| CaO | | 0.03% by weight. |
| Cl | | <0.02% by weight. |
| $SO_4$ | | 0.01% by weight. |
| Loss on ignition | 7.20% by weight | 2.26% by weight. |
| Surface Area | 200 sq. m./gm | 80–100 sq. m./gm. |
| Particle sizes | ½ inch to ¼ mesh | ½ inch to ⅛ inch. |

The dehydration catalyst may be used in either a packed tower or horizontal reactor, provided with suitable temperature controls and auxiliary equipment as will be apparent to those skilled in the art.

The following procedure illustrates a representative manner in which the process may be carried out:

EXAMPLE

Twenty-seven milliliters (25 grams) commercial 2-methylcyclohexanol containing about 98.4% trans isomer, 1.3% cis isomer and .3% light ends was pumped at a rate of 1.3 ml./min. into a glass reactor packed with 165.2 grams of dehydrating Catalyst I which had been predried at 300° C. for 2.5 hours. The temperature of the reactor was controlled so as to provide a reaction temperature of 220° C. The space velocity through the reactor was 0.0079 ml./gm./min. The effluent from the reactor was passed through cooled glass traps. A large part of the product water was removed from the organic layer by decantation. The organic layer containing some water, mixed methylcyclohexenes, methylenecyclohexane and unreacted 2-methylcyclohexanol was fractionally distilled; water and olefinic products (boiling range up through about 110° C.) were removed overhead, and the material remaining in the distillation flask, 2-methylcyclohexanol, was suitable for recycle to the dehydration step.

The organic fraction weighed 21.4 grams of which 23.83% was determined to be 1-methylcyclohexene, 9.03% 3- and 4-methylcyclohexenes, 0.5% other conversion products and 66.64% 2-methylcyclohexanol starting material. This represents a 33.4% conversion of the starting material into dehydration products having a weight ratio of 1-methylcyclohexene to 3- and 4-isomers and other products of approximately 2.50.

The process is similarly carried out at other temperatures in the preferred 210° C. to 250° C. range and at different space velocities and with different alkaline alumina dehydration catalysts.

The space velocity may be adjusted for each catalyst and temperature in a manner which will provide the greatest volume of product having the desired high ratio of 1-methyl isomer.

The following table gives the results of a number of runs with Catalysts I and II at different space velocities, different length of time, and at various temperatures within and outside of the critical range.

CATALYST I

|   | Temp., °C. | Time, Min. | Space Vel., ml./gm./min. | Converted Material in Recovered Organic Products Percent/Weight | Weight ratio, 1-MCH/3+ 4+ other |
|---|---|---|---|---|---|
| 1 | 400 | 37 | 0.0042 | 99.5 | 1.01 |
| 2 | 287 | 41 | 0.0036 | 100 | 0.77 |
| 3 | 284 | 42 | 0.0036 | 100 | 0.81 |
| 4 | 283 | 19 | 0.0108 | 99.6 | 0.67 |
| 5 | 368 | 20 | 0.0079 | 99.6 | 1.02 |
| 6 | 242 | 384 | 0.0073 | 25.7 | 1.47 |
| 7 | 236 | 355 | 0.0074 | 22.3 | 1.82 |
| 8 | 233 | 68 | 0.0079 | 19.8 | 1.54 |
| 9 | 232 | 302 | 0.0079 | 22 | 1.55 |
| 10 | 227 | 119 | 0.0079 | 11.7 | 1.72 |
| 11 | 224 | 189 | 0.0079 | 11.8 | 1.74 |
| 12 | 223 | 61 | 0.0067 | 8.26 | 2.19 |
| 13 | 221 | 100 | 0.0073 | 8.71 | 1.96 |
| 14 | 221 | 150 | 0.0073 | 9.35 | 1.91 |
| 15 | 218 | 68 | 0.0042 | 18.0 | 1.69 |
| 16 | 220 | 21 | 0.0079 | 33.4 | 2.50 |
| 17 | 216 | 80 | 0.0018 | 44.0 | 2.01 |

CATALYST II

|   | Temp., °C. | Time, Min. | Space Vel., ml./gm./min. | Converted Material in Recovered Organic Products Percent/Weight | Weight ratio, 1-MCH/3+ 4+ other |
|---|---|---|---|---|---|
| 1 | 301 | 107 | 0.0065 | 99.5 | 0.83 |
| 2 | 264 | 72 | 0.0022 | 44.3 | 1.17 |
| 3 | 260 | 65 | 0.0065 | 6.8 | 1.43 |
| 4 | 240 | 136 | 0.0022 | 16.8 | 1.71 |
| 5 | 239 | 52 | 0.0065 | 2.4 | 2.00 |

It will be seen that runs 1–5 with Catalyst I, all conducted at temperatures above 250° C., while providing substantially complete conversion of the starting material, did not result in a desirable ratio of the 1-methyl isomer in the product. Runs 6–17 with Catalyst I at varying temperatures from 215° C. to 242° C. all resulted in satisfactory products, although the conversion of starting material was less than 50%. Likewise, with Catalyst II runs 1 and 2 at temperatures of 301° C. and 264° C., respectively, did not produce a desirably high ratio of 1-methyl isomer. Run 3 at 260° C. with a higher space velocity than in run 2 converted much less of the starting material to olefinic reaction products, but gave a substantially higher 1-methyl ratio. Improved results were obtained in runs 4 and 5 below 250° C.

The curve shown in the figure is based primarily upon runs conducted at a space velocity of 0.0079 milliliter of 2-methylcyclohexanol per gram of catalyst per minute. It will be understood that it is a median line based on data reported in the foregoing table and from a great number of additional runs.

I claim:

1. A process for the production of a methylcyclohexene mixture having a weight ratio of 1-methylcyclohexene to other methylcyclohexene isomers and methylenecyclohexane of greater than 1.3 comprising passing 2-methylcyclohexanol over an aluminum oxide dehydrating catalyst at a temperature in the range of about 210° to 250° C. and at a space velocity correlated so as to convert about 2 to 50% of the 2-methylcyclohexanol to mixed methylcyclohexenes and methylenecyclohexane.

2. The process of claim 1 wherein the dehydration catalyst contains from about 0.02% to about 1.0% by weight of $Na_2O$.

3. The process of claim 1 wherein the mixed methylcyclohexenes in the effluent from the catalyst are separated from unreacted 2-methylcyclohexanol and the latter is recycled to the catalyst.

4. A process for the production of a methylcyclohexene mixture having a weight ratio of 1-methylcyclohexene to other methylcyclohexene isomers and methylenecyclohexane of greater than 1.3 comprising passing 2-methylcyclohexanol over an aluminum oxide dehydrating catalyst containing from about 0.35 to 0.80% of $Na_2O$ and having a surface area of about 80 to 200 square meters per gram at a temperature in the range of about 210° C. to 250° C. and at a space velocity of about 0.0018 to 0.0079 milliliter per gram of catalyst per minute.

References Cited by the Examiner

UNITED STATES PATENTS 2,866,831 12/1958 Lambert et al. _____ 260—666
3,016,409 1/1962 Vesely _____ 260—666

FOREIGN PATENTS 451,535 10/1927 Germany.

DELBERT E. GANTZ, *Primary Examiner.*

V. O'KEEFE, *Assistant Examiner.*